(12) United States Patent
Yamada et al.

(10) Patent No.: US 7,744,706 B2
(45) Date of Patent: Jun. 29, 2010

(54) SOLDER ALLOY FOR BONDING OXIDE MATERIAL, AND SOLDER JOINT USING THE SAME

(75) Inventors: Minoru Yamada, Koganei (JP); Nobuhiko Chiwata, Yasugi (JP); Takayuki Moriwaki, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/244,481

(22) Filed: Oct. 2, 2008

(65) Prior Publication Data

US 2009/0104071 A1 Apr. 23, 2009

(30) Foreign Application Priority Data

Oct. 3, 2007 (JP) ............................. 2007-259319

(51) Int. Cl.
*C22C 30/00* (2006.01)
*C22C 7/00* (2006.01)
(52) U.S. Cl. ...................... 148/442; 148/400; 420/562; 420/577; 420/589
(58) Field of Classification Search ................. 420/562, 420/577, 589; 148/400, 442
See application file for complete search history.

(56) References Cited

U.S. PATENT DOCUMENTS 5,833,921 A * 11/1998 Paruchuri et al. ........... 420/589

FOREIGN PATENT DOCUMENTS

| JP | 2000-141078 A | | 5/2000 |
| JP | 2002-20143 A | | 1/2002 |
| JP | 2002-542138 A | | 12/2002 |
| JP | 2005081404 | * | 3/2005 |
| JP | 2006-159278 A | | 6/2006 |

* cited by examiner

*Primary Examiner*—Sikyin Ip
(74) *Attorney, Agent, or Firm*—Sughrue Mion, PLLC

(57) ABSTRACT

The invention provides a solder alloy for bonding an oxide material, including more than 0% but not more than 1.0% of Mg and the balance being substantially Bi and Sn. Preferably, the alloy includes 0.01 to 0.6% of Mg, 35 to 86% of Bi, and the balance being substantially Sn. The invention can be used for bonding an oxide material, such as bonding glasses to each other. According to the invention, a low-cost solder joint of an oxide material is also provided.

6 Claims, 3 Drawing Sheets

SOLDER ALLOY FOR BONDING OXIDE MATERIAL, AND SOLDER JOINT USING THE SAME

FIELD OF THE INVENTION

The invention relates to a solder alloy having a low melting point for bonding an oxide, which can be applied to bonding of an oxide material, such as glass or ceramic. The invention also relates to a solder joint of an oxide material bonded using the solder alloy.

BACKGROUND OF THE INVENTION

Conventionally, a solder containing lead, or lead glass frit has been mainly used as means for bonding and sealing in the technique of bonding glasses and the like. However, lead has become impossible to be used due to environmental problems. On the other hand, among various brazing materials, brazing sheets, and the like described in "JIS Handbook (3) Non-ferrous Metals," there are no materials, in the present situation, having a melting point of not higher than 400° C., having good adhesiveness, and being capable of bonding without causing the shrinkage cracking in glass due to the difference in thermal expansion coefficient between the glass and a brazing material.

On the other hand, there are applications which require sealing by solder, such as double glazing, vacuum containers, gas sealed containers, and the like, and thus the development of lead-free alloy solder suitable for these applications has been desired.

Recently, In (indium) and an In alloy are proposed for metal sealing materials (see JP-A-2002-020143 and JP-A-2002-542138). An solder alloy containing a large amount of In is proposed, in which many types of elements, such as Al (aluminum), Ag (silver), Cu (copper), and Zn (zinc), are added to Sn (tin) being the main component (see JP-A-2000-141078). Bi based solder comprising Bi (bismuth), Zn, Sb (antimony), Al, In, and the like is also proposed, and further, a solder alloy having a further lower melting point is also proposed (see JP-A-2006-159278).

The solder alloys proposed in JP-A-2002-020143, JP-A-2002-542138, JP-A-2000-141078, and JP-A-2006-159278 have excellent bonding strength and airtight sealing properties to oxide materials, such as glass or ceramic, as lead free solder alloys having a low melting point. However, In is necessarily added, which is poor in its resources. Thus, the approaches in JP-A-2002-020143 and JP-A-2002-542138 are limited in use because they are expensive. Although the approaches in JP-A-2000-141078 and JP-A-2006-159278 allegedly provide effect with the addition of a relatively small amount of In, the alloys contain zinc having high vapor pressure, so that the vacuum container may be contaminated. JP-A-2006-159278 further employs highly noxious antimony (Sb), so that the effect on the human body should be considered in use.

The invention solves the drawbacks as described above, and aims to provide a solder alloy for bonding an oxide having excellent bonding strength, airtight sealing properties and a low melting point, which has a componential system as simple as possible. An oxide joint is also provided using the solder alloy.

SUMMARY OF THE INVENTION

The inventors have found that a solder alloy having the following composition balance can directly solder an oxide material including glass, with high bonding strength.

The invention provides a solder alloy for bonding an oxide material, comprising, by mass, not more than 1.0% (not including 0%) of Mg and the balance being substantially Bi and Sn.

According to the invention, the alloy preferably comprises 0.01 to 0.6% of Mg and more preferably 0.03 to 0.5% of Mg.

The basic composition of the alloy according to the invention is Sn—Bi based alloy. Preferably it comprises, by mass, 35 to 86% of Bi and more preferably 40 to 60% of Bi, and the balance being substantially Sn.

The solder alloy according to the invention is useful for bonding glasses and can be applied to bonding oxide materials to each other, which have been conventionally difficult to be bonded.

The solder alloy according to the invention can bond an oxide material, such as glasses, firmly, and a low-cost solder joint wherein the solder alloy is jointed to an oxide material can be provided.

The solder alloy for bonding an oxide material according to the invention is lead-free and friendly to environment and has a low melting point so that excellent bonding strength and airtight sealing properties can be obtained without requiring complicated processes for heating and cooling. The solder alloy can bond an oxide material, such as glass, so that the solder alloy is suitable for the sealing of, for example, precision electronic parts, which require to reduce thermal damage, double glazing, and glass containers.

DETAILED DESCRIPTION OF THE INVENTION

Figure 1:
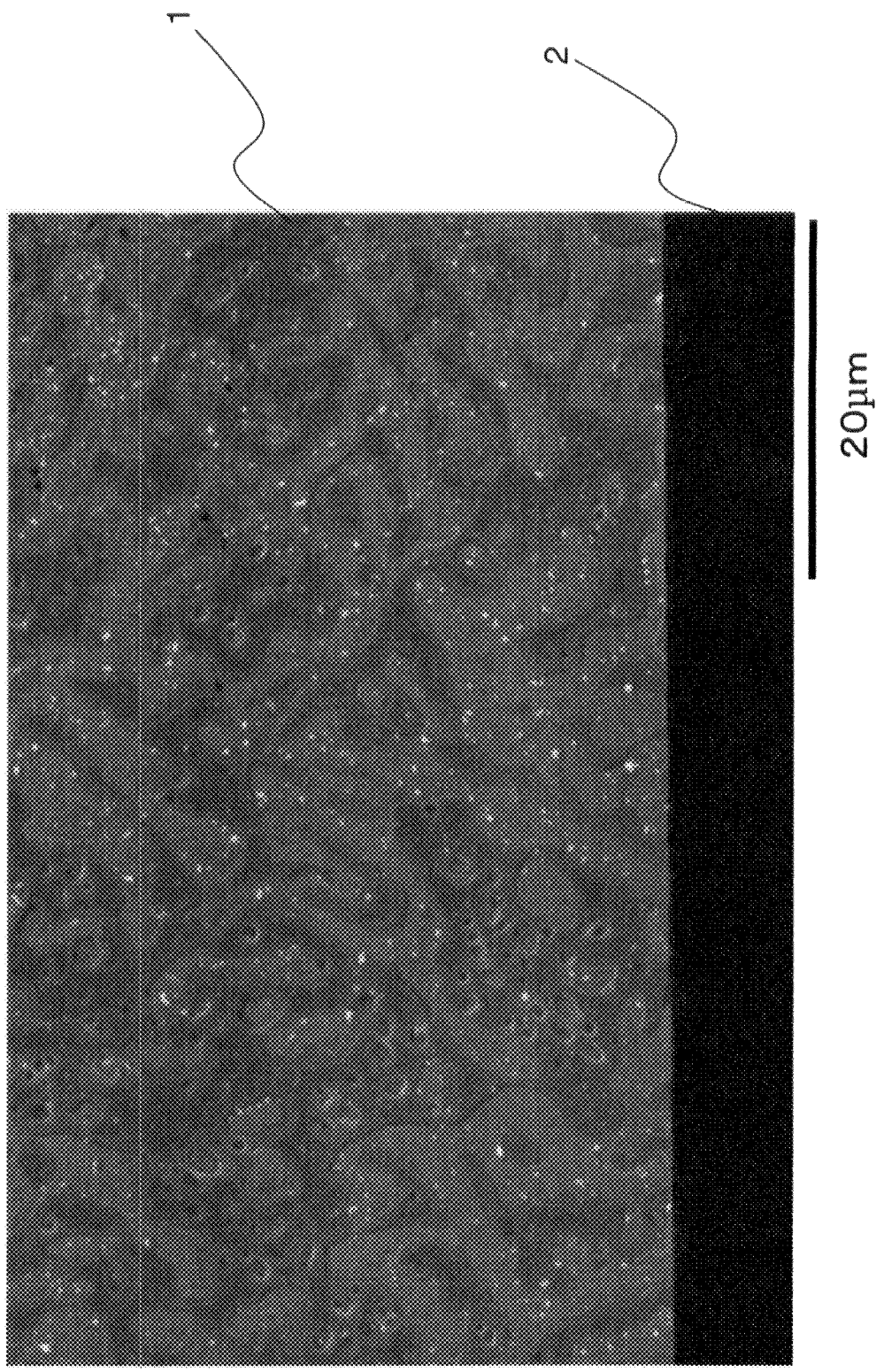
FIG. 1 is an electron micrograph showing one example of a bonding cross section of a solder alloy of example 2 according to the invention bonded to a soda lime glass substrate.

The base composition of the solder alloy according to the invention is Sn—Bi based solder. The Sn—Bi based alloy is suitable for applications that avoid thermal damage because it has a low melting point of 139° C. at its eutectic point.

The reason for limiting the composition (by mass %) of the solder alloy of the invention will be described.

Mg is the most important element for the solder alloy and is an element that enables bonding an oxide material.

Although the Sn—Bi binary solder alloy can exhibit a low melting point as described above, it is difficult for the Sn—Bi binary solder alloy to bond an oxide material even if the ratio of Sn to Bi is changed.

The inventors studied and found that a predetermined amount of Mg improves the wettability to an oxide dramatically, and enables bonding the oxide material, such as glass. It is considered that this is because Mg has high oxygen affinity and a strong tendency to form an oxide, so that Mg in the solder alloy is bound to the oxide material to be bonded, and as a result, the wettability to the oxide material is improved.

However, the following problem is feared: if Mg is added too much, Mg excessively forms an oxide to conversely decrease the bonding properties, and Mg reacts vigorously with oxygen in a bonding atmosphere to burn a bonded material (oxide) and a bonding jig. Therefore, according to the invention, the amount of Mg is defined to be not more than 1.0% by mass.

Mg is an element which is very easily oxidized. If an amount of Mg is less than 0.01% by mass, it is difficult to add Mg, so that component adjustment is difficult. Therefore, an amount of Mg is preferably not less than 0.01%. It is more preferably 0.01 to 0.6% and further preferably 0.03 to 0.5%.

Sn and Bi are basic components for exhibiting the low melting point of the solder alloy for bonding an oxide material according to the invention, as described above. In order to control the liquidus temperature at not higher than 200° C., an amount of Bi is preferably 35 to 86% by mass, and the balance is substantially Sn.

Furthermore, in order to control the liquidus temperature at not higher than 180° C., the amount of Bi is more preferably 40 to 60% by mass, and the balance is substantially Sn.

In the invention, the bonding properties to an oxide material are obtained by adding a predetermined amount of Mg to a base alloy of Sn—Bi having a low melting point. It is possible to contain other elements in an amount that does not affect on the effect of the invention.

For example, Cu, Ag, and Ni are effective for structural uniformity, the adjustment of expansion and shrinkage, the adjustment of hardness, and the like.

Al, Zn, and Y improve the bonding strength and viscosity.

Ti, Ge, and P suppress generation of oxide during solder melting.

Any of the elements do not inhibit the effect of the invention, if the total amount thereof is not more than 1% by mass.

Since Fe, Co, Cr, V, and Mn, as unavoidable impurities, inhibit solder wettability, the total of amount the elements is preferably restricted to not more than 1% by mass. It is desirable that the total amount of the elements is more preferably not more than 500 ppm by mass.

Since Ga and B cause generation of voids, the elements are preferably restricted to not more than 500 ppm by mass. It is desirable that the elements are not more than 100 ppm by mass.

The solder alloy for bonding an oxide material according to the invention can achieve excellent bonding strength and airtight sealing properties to an oxide material. For example, the solder alloy can exhibit excellent bonding ability, of course, to ceramic, such as $Al_2O_3$ (alumina), and glass, such as soda lime based glass, and also to other oxides.

Of course, since the solder alloy according to the invention is a Sn—Bi based solder alloy for bonding an oxide material, the solder alloy is used not only for bonding oxides, such as glass, to each other, but also bonding e.g. an oxide material and a metal. The solder alloy has bonding ability also to a metal, such as various stainless steels, copper, Fe—Ni based alloys, and Al.

The solder alloy according to the invention can also be used as an alternative of primer treatment for soldering by applying the solder alloy on an oxide or nitride surface.

EXAMPLE 1

Elements were weighed to be compositions in Table 1 and were melted with high frequency in an Ar atmosphere, and then poured into a mold in the atmosphere to make solder alloys for bonding an oxide material. Then, the obtained solder alloys were evaluated by test methods described below. In this evaluation, the solder alloys were cut into small pieces so as to be easily soldered.

The solder alloy 1 of Sample No. 2 was bonded to a soda lime glass substrate 2, and the bonding state was checked. At this time, the bonding cross section was polished by ion milling. The result of observing the bonding state is shown in FIG. 1.

It was confirmed that the solder alloy 1 according to the invention and the soda lime glass substrate 2 were bonded, as shown in FIG. 1.

The solder alloy 3 sample No. 12 was bonded to an $Al_2O_3$ substrate 4 and a MgO (magnesia) substrate 5, and the bonding state was checked. At this time, as a method for bonding to the $Al_2O_3$ substrate and the MgO substrate, each oxide substrate was heated to about 195° C., and soldering was performed with applying ultrasonic waves using an ultrasonic soldering iron (SUNBONDER USM-III manufactured by KURODA TECHNO Co., Ltd.). The result of observing the bonding state is shown in FIGS. 2 and 3.

Figure 2:
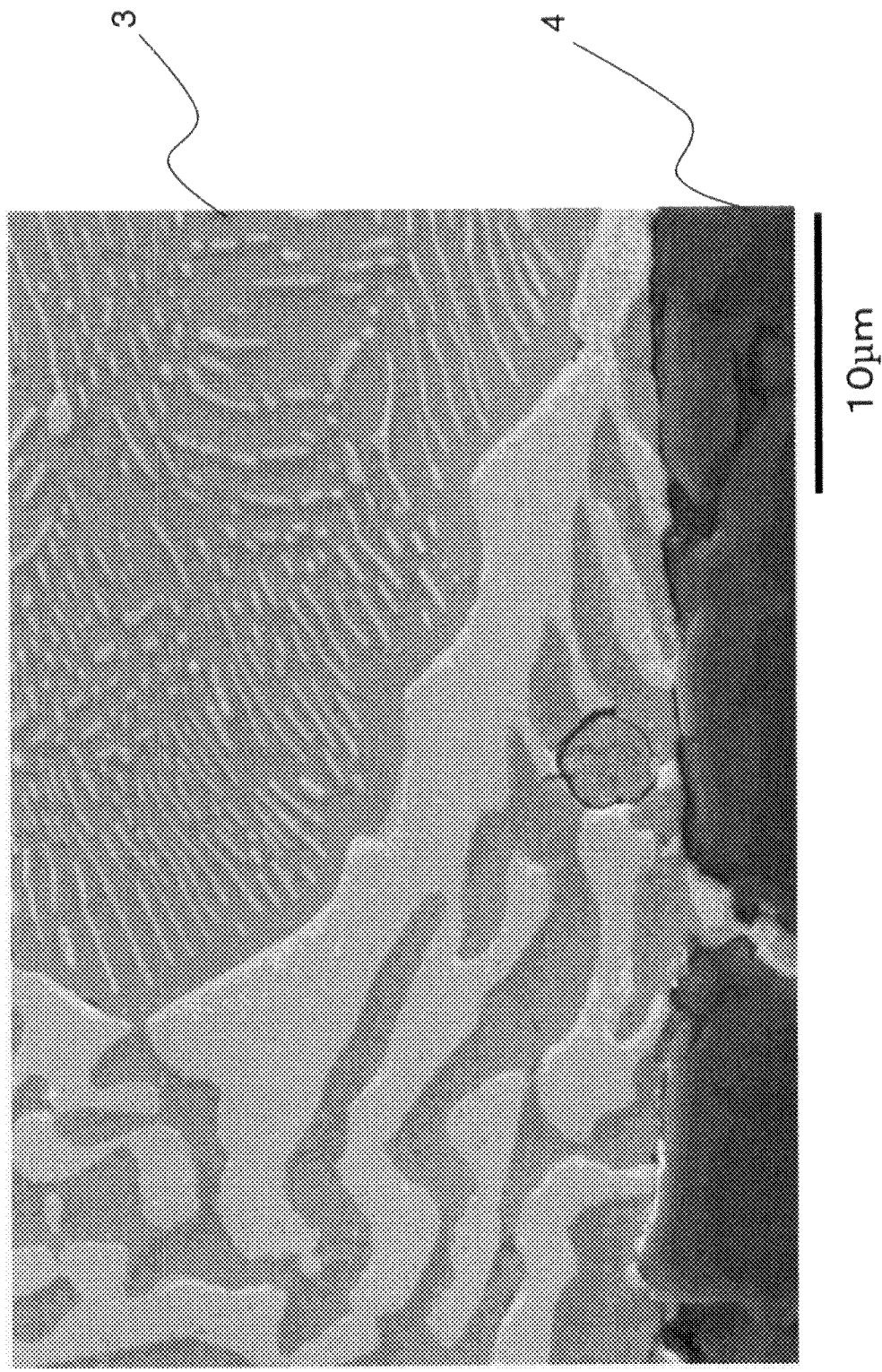
FIG. 2 is an electron micrograph showing one example of a bonding cross section of a solder alloy of example 12 according to the invention bonded to an $Al_2O_3$ substrate.
Figure 3:
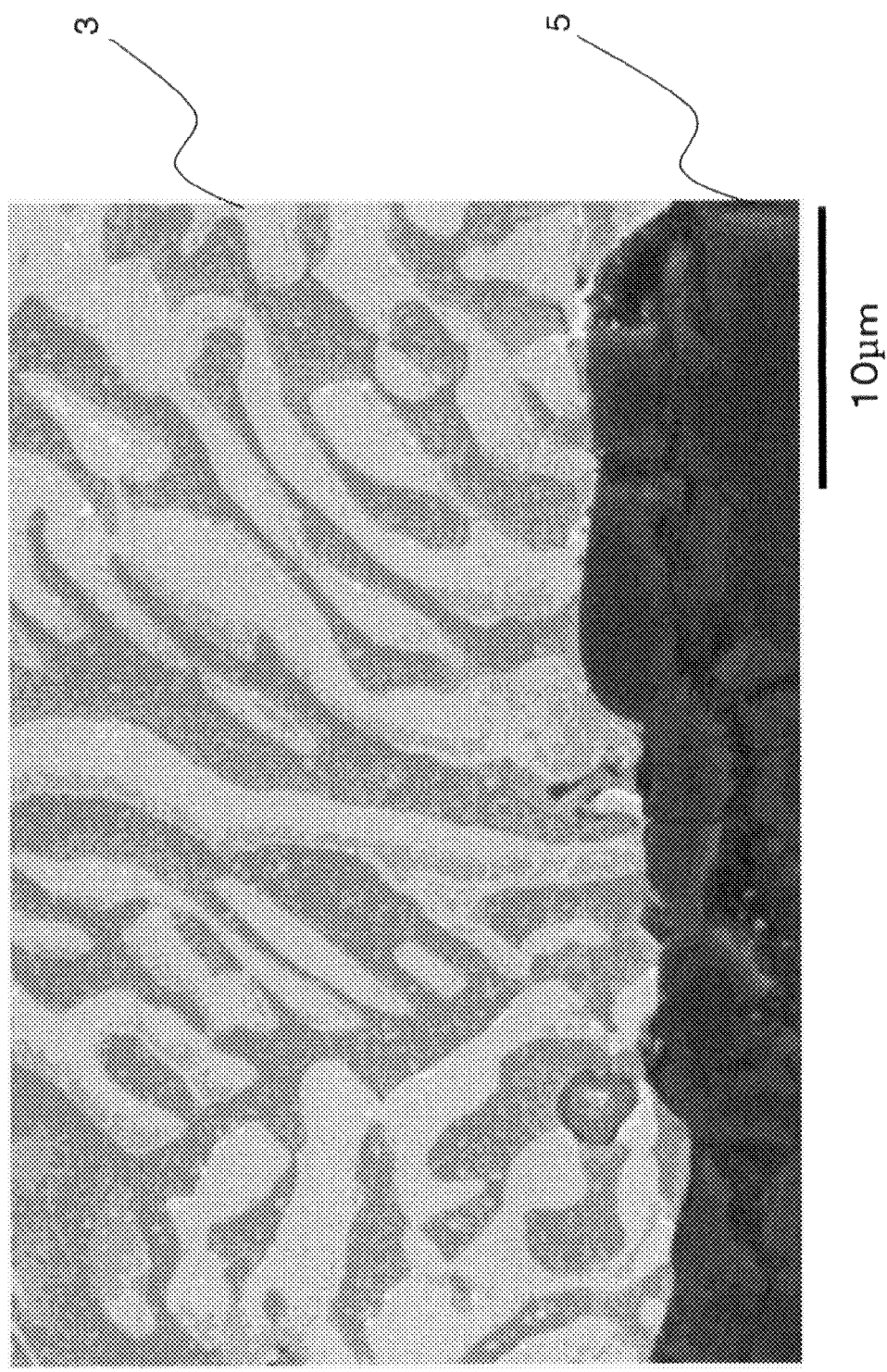
FIG. 3 is an electron micrograph showing one example of a bonding cross section of a solder alloy of example 12 according to the invention bonded to an MgO substrate.

It was confirmed that the solder alloy 3 according to the invention was bonded to the $Al_2O_3$ substrate 4 and the MgO substrate 5, as shown in FIGS. 2 and 3.

"Method for Measuring Three-Point Bending Strength"

In order to measure a bonding strength, a test piece including two glass sheets bonded with the solder alloy shown in Table 1 was prepared, and a three-point bending test was performed thereon. The test piece includes, two soda lime glasses having a thickness 3 mm, a length of 50 mm and a width of 25 mm. The glasses were bonded in a position offset to each other, and 6 mm length was bonded. Then, three-point bending was carried out and the load was measured when the bonding portion was peeled off and the two soda lime glass substrates were separated and broken. MODEL-1308 manufactured by AIKOH ENGINEERING CO., LTD. was used for the load evaluation tester.

"Method for Measuring Residual Stress in Glass"

A soda lime glass substrate having a thickness of 5 mm, a length of 40 mm and a width of 40 mm was placed on a hot plate heated at about 380° C. in the air to remove organic materials from the substrate surface, and a solder alloy having 0.4 mm thickness was applied on one surface of the substrate in the air. Then, the internal stress in the glass was measured by a polarization compensation method (the Senarmont method). For measurement procedure, the internal stress on the side to which the solder alloy was bonded, and the internal stress on the side to which the solder alloy was not applied were obtained, and the difference was taken, wherein a compressive stress is taken as positive. The difference was determined as an increase in the internal stress in the glass due to applying the solder alloy.

TABLE 1

| sample No. | analysis value (by mass %) | | | three-point bending ($N/mm^2$) | residual stress ($N/mm^2$) | remarks |
|---|---|---|---|---|---|---|
| | Sn | Bi | Mg | | | |
| 1 | Bal. | 44.56 | 0.37 | 2.05 | −0.81 | example of the present invention |
| 2 | Bal. | 54.58 | 0.2 | 1.67 | −0.95 | |
| 3 | Bal. | 29.65 | 0.43 | 1.69 | −1.12 | |
| 4 | Bal. | 35.72 | 0.19 | 2.11 | −1.16 | |
| 5 | Bal. | 55.94 | 0.34 | 2.02 | −0.88 | |
| 6 | Bal. | 33.83 | 0.52 | 1.74 | −0.98 | |
| 7 | Bal. | 53.03 | 0.58 | 2.05 | −0.77 | |
| 8 | Bal. | 33.89 | 0.17 | 2.08 | −1.20 | |
| 9 | Bal. | 54.23 | 0.59 | 2.03 | −0.95 | |
| 10 | Bal. | 44.25 | 0.52 | 1.90 | −1.02 | |
| 11 | Bal. | 45.49 | 0.19 | 1.39 | −1.09 | |
| 12 | Bal. | 46.13 | 0.37 | 1.66 | −0.98 | |
| 13 | Bal. | 35.51 | 0.37 | 2.28 | −1.12 | |
| 14 | Bal. | 55.00 | — | N/A | N/A | comparative example |

According to Table 1, the test pieces using solder alloys of samples Nos. 1 to 13 according to the invention had sufficient bonding strength with a three-point bending strength of not lower than 1.0 N/mm$^2$, and a low residual stress of not greater than 2.0 N/mm$^2$ in absolute value. Sample No. 14 was out of the invention, to which Mg was not added, could not be applied to the glass, and bonding was impossible.

EXAMPLE 2

Elements were weighed to be compositions in Table 2 and melted with high frequency in an Ar atmosphere, and then poured into a mold in the atmosphere to make solder alloys. Then, the obtained solder alloys were evaluated by a test method described below. In this evaluation, the solder alloys were cut into small pieces so as to be easily soldered.

"Leak Test"

A soda lime glass substrate having a thickness of 3 mm, a length of 50 mm, and a width of 50 mm was heated at 170° C. In the state, the solder alloy was applied to the periphery on one surface of the substrate in width of about 2 mm. On the other hand, another soda lime glass substrate having the same dimensions was provided with a hole of 3 φ mm diameter at the central thereof, and the solder alloy was applied to the periphery with about 2 mm width of the substrate. Then, the above two soda lime glass substrates were laid on each other on a hot plate so that the solders were adjacent to each other. After the atmosphere was evacuated, the soda lime glass substrates were heated to 200° C. At this time, stainless steel foil of about 1 mm square and 0.1 mm thickness was placed between the two soda lime glass substrates as a spacer so that the two soda lime glass substrates had a clearance of about 0.1 mm. Therefore, a container having therein a 0.1 mm high space was formed.

Then, while the obtained container was vacuumed and degassed, a helium gas was blown on each bonding portion to measure a leak of the helium gas by a leak detector (HELIOT 700 manufactured by ULVAC, Inc.).

The measurement of bonding strength by three-point bending test was also performed, as in Example 1. The compositions of the solder alloys used in this experiment are shown in Table 2, along with the test results.

TABLE 2

| sample No. | composition (by mass %) | | | three-point bending (N/mm$^2$) | leak [Pam$^3$/s] | remarks |
|---|---|---|---|---|---|---|
| | Sn | Bi | Mg | | | |
| 15 | bal. | 46.58 | 0.18 | 2.05 | $0.8 \times 10^{-11}$ | example of the present invention |
| 16 | bal. | 54.75 | 0.03 | 4.15 | $1.4 \times 10^{-11}$ | |

According to Table 2, for the containers using solder alloys of samples Nos. 15 and 16 according to the invention, a low leak value of not greater than $1.5 \times 10^{-11}$ Pam$^3$/s was obtained, and high airtightness was maintained.

For the test pieces using the solder alloys of samples Nos. 15 and 16, sufficient bonding strength with a three-point bending strength of not lower than 1.0 N/mm$^2$ was obtained, and bonding to the soda lime glass substrates was confirmed.

The invention claimed is:

1. A solder alloy for bonding an oxide material, consisting of, by mass, more than 0.17% but not more than 1.0% of Mg, 44.25-60% of Bi and the balance being Sn and unavoidable impurities.

2. The solder alloy according to claim 1, wherein the alloy comprises 0.17 to 0.6% of Mg by mass.

3. The solder alloy according to claim 1, wherein the alloy comprises 0.17 to 0.5% of Mg by mass.

4. The solder alloy according to claim 1, wherein the oxide material is a glass.

5. A solder joint wherein the solder alloy as defined in claim 1 is joined to an oxide material.

6. The solder joint according to claim 5, wherein the oxide material is a glass.

* * * * *